(12) United States Patent
Price et al.

(10) Patent No.: US 10,760,225 B2
(45) Date of Patent: Sep. 1, 2020

(54) SYSTEM AND METHOD FOR PRODUCING ARTIFICIAL TURF FILAMENTS

(71) Applicant: Hellas Construction, Inc., Austin, TX (US)

(72) Inventors: Joseph Claude Price, Dadesville, AL (US); Reed James Seaton, Austin, TX (US)

( * ) Notice: Subject to any disclaimer, the term of this patent is extended or adjusted under 35 U.S.C. 154(b) by 114 days.

(21) Appl. No.: 15/637,403

(22) Filed: Jun. 29, 2017

(65) Prior Publication Data
US 2018/0002870 A1 Jan. 4, 2018

Related U.S. Application Data

(60) Provisional application No. 62/356,085, filed on Jun. 29, 2016.

(51) Int. Cl.
| | |
|---|---|
| B29C 48/05 | (2019.01) |
| D01D 13/02 | (2006.01) |
| D01D 4/02 | (2006.01) |
| E01C 13/08 | (2006.01) |
| B29C 71/02 | (2006.01) |
| D01D 5/22 | (2006.01) |
| B29C 48/88 | (2019.01) |
| B29C 71/00 | (2006.01) |
| B29L 31/00 | (2006.01) |
| B29C 35/04 | (2006.01) |

(52) U.S. Cl.
CPC ............ *E01C 13/083* (2013.01); *B29C 48/05* (2019.02); *B29C 48/919* (2019.02); *B29C 71/02* (2013.01); *D01D 5/22* (2013.01); *D01D 13/02* (2013.01); *E01C 13/08* (2013.01); *B29C 35/045* (2013.01); *B29C 71/0072* (2013.01); *B29L 2031/732* (2013.01); *D01D 4/02* (2013.01)

(58) Field of Classification Search
CPC ....... E01C 13/083; E01C 13/08; B29C 71/02; B29C 48/919; B29C 48/05; B29C 35/045; B29C 71/0072; D01D 4/02; B29L 2031/732
See application file for complete search history.

(56) References Cited

U.S. PATENT DOCUMENTS

| | | | |
|---|---|---|---|
| 4,343,860 A | 8/1982 | Fernstrom et al. | |
| 4,489,543 A | 12/1984 | Bromley et al. | |
| 5,281,476 A | 1/1994 | Koyonagi et al. | |
| 5,462,778 A * | 10/1995 | Ishikawa ................ | D01D 5/253 425/72.2 |
| 5,510,183 A | 4/1996 | Travelute et al. | |
| 5,578,373 A | 11/1996 | Kobayashi et al. | |
| 7,939,144 B2 | 5/2011 | Verleyen | |
| 2003/0157275 A1 | 9/2003 | Weghuis et al. | |
| 2014/0242304 A1 * | 8/2014 | Sandkuehler ......... | C08F 210/16 428/17 |

* cited by examiner

*Primary Examiner* — Lawrence Averick
(74) *Attorney, Agent, or Firm* — Stoll Keenan Ogden PLLC; Dana Howard

(57) ABSTRACT

A system and method for producing artificial turf filaments according to one example embodiment includes an artificial turf filament, a first air drawn oven for heating the filament, a roll stand for applying an aqueous liquid to the filament and a second air drawn oven for heating the filament. In multiple embodiments, the filament has a latent helix shape when exposed to manufacturing or ambient heat.

5 Claims, 4 Drawing Sheets

SYSTEM AND METHOD FOR PRODUCING ARTIFICIAL TURF FILAMENTS

CROSS-REFERENCE TO RELATED APPLICATION

This application claims the benefit of U.S. Provisional Application No. 62/356,085, entitled "System And Method For Producing Artificial Turf Filaments" and filed on Jun. 29, 2016, the disclosures of which are incorporated herein by reference.

TECHNICAL FIELD

The present invention relates to systems and methods for producing artificial turf filaments.

DESCRIPTION OF RELATED ART

Currently, systems and methods for producing artificial turf filaments having a helical shape utilize water drawn ovens. Such systems and methods produce filaments that exhibit a helix shape almost instantly, prior to completion of manufacturing and installation of the filaments. Installation of artificial turf surfaces having filaments with a crimped or helical shape is more difficult and requires substantially more time than installation of artificial turf surfaces comprised of straight filaments.

There are many advantages, however, to having helically shaped filaments. Such filaments provide an aesthetically pleasing appearance, more akin to natural grass than typical straight filaments, provide improved resiliency to the artificial turf surface and may reduce the amount of infill materials required for the artificial turf surface.

Accordingly, it will be appreciated that systems and methods for producing artificial turf filaments that provide a latent helical crimp to the filaments and allow for easy installation of artificial turf surfaces while the filaments are straight are desired.

SUMMARY

The inventor has created a system for producing artificial turf surfaces. In a preferred embodiment, the system comprises an artificial turf filament, a first air drawn oven for heating the filament, a roll stand for applying an aqueous liquid to the filament and a second air drawn oven for heating the filament. In the preferred embodiment, the filament exhibits a helical shape when exposed to ambient or manufacturing heat.

In alternative embodiments, the filament exhibits a helical shape when exposed to manufacturing heat in the form of a hot water bath at about 85° C.

In alternative embodiments, the filament exhibits a helical shape when exposed to ambient heat at about 65.56° C.

In alternative embodiments, the system further comprises a spinneret. In alternative embodiments, the filament is produced through melt extrusion using a spinneret. In alternative embodiments, the extruded filament has fine surface distortions.

The inventor has created a method for installing an artificial turf surface. In a preferred embodiment, the method comprises the steps of producing an artificial turf surface having artificial turf filaments that exhibit a helical shape when exposed to ambient heat, installing the artificial turf surface while the filaments are straight and exposing the filaments to ambient heat after installation.

In alternative embodiments, the filaments are exposed to ambient heat of about 65.56° C. after installation.

In alternative embodiments, the artificial turf filaments have fine surface distortions.

BRIEF DESCRIPTION OF THE DRAWINGS

The above-mentioned and other features and advantages of the various embodiments, and the manner of attaining them, will become more apparent and will be better understood by reference to the accompanying drawings.

MULTIPLE EMBODIMENTS AND ALTERNATIVES

Figure 1:
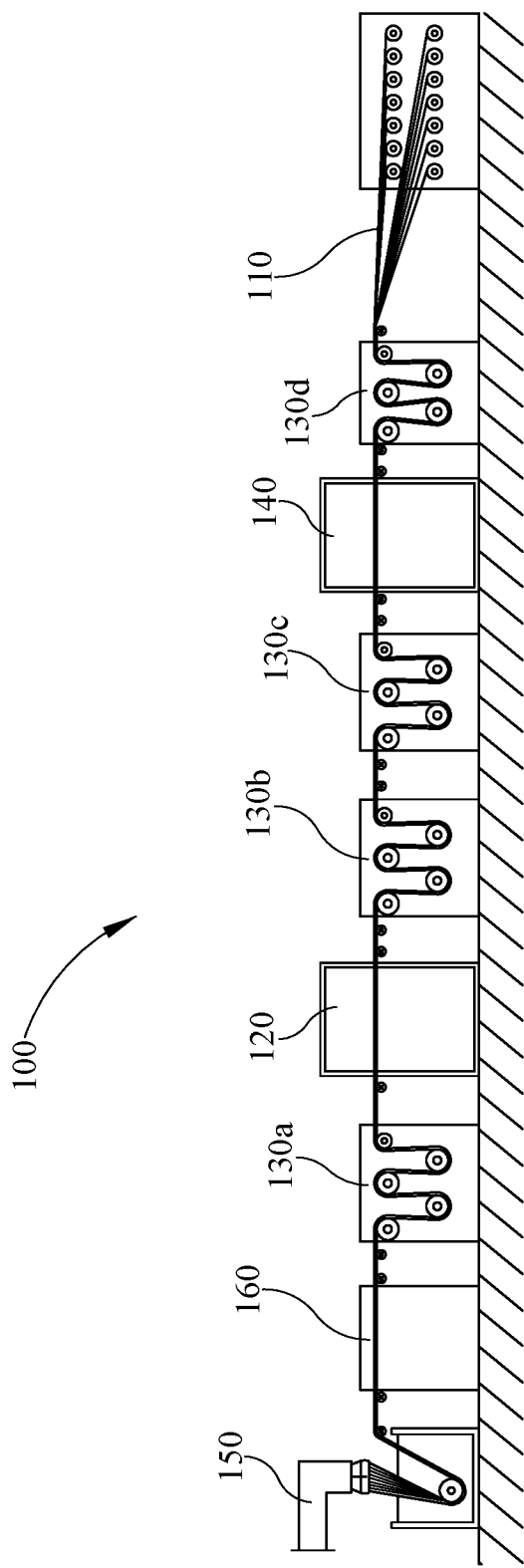
FIG. 1 is a schematic view of a system for producing artificial turf filaments according to multiple embodiments and alternatives.

The following description and drawings illustrate embodiments sufficiently to enable those skilled in the art to practice the present invention. It is to be understood that the disclosure is not limited to the details of construction and the arrangement of components set forth in the following description or illustrated in the drawings. The invention is capable of other embodiments and of being practiced or of being carried out in various ways. For example, other embodiments may incorporate structural, chronological, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Turning now to the drawings, and more particularly to FIG. 1, an example embodiment of a system 100 for producing artificial turf filaments 110 is illustrated. The system 100 produces filaments 110 or piles for artificial turf surfaces that exhibit a latent helix or corkscrew shape when exposed to increased temperatures via manufacturing or ambient heat.

In multiple embodiments, the system 100 includes a first air drawn oven 120, a series of roll stands and a second air drawn oven 140. In use, the system 100 directs a filament, after melt extrusion, through a series of steps to cool and dry the filament at ambient temperatures. In some embodiments, filaments are then drawn onto a first roll stand 130*a*. Thereafter, the filament is heated in the first air drawn oven 120 causing the filament to stretch. Next, the filament is drawn onto a second roll stand 130*b* and a third roll stand 130*c*. As the filament is drawn onto the third roll stand 130*c*, aqueous liquid or pure water is applied to lightly coat the filament. The filament is then heated in the second air drawn oven 140 at a higher temperature than the first air drawn oven 120. In some embodiments, after the second heating, the filaments are drawn onto an optional fourth roll stand 130*d* to control shrinkage.

In some embodiments, after the second heating or fourth roll stand, there is a series of final steps comprising lubricating, winding, twisting, binding and tufting, said steps occurring prior to installation of the artificial turf surface. Said lubricating involves applying an aqueous liquid to the filaments to facilitate the winding of the filaments onto spools. In some embodiments, a plurality of filaments are twisted together prior to binding and tufting. Tufting involves attaching the filaments to a backing. In some embodiments, said backing comprises primary and secondary backing materials. In some embodiments, tufting involves using large needles threaded with the filaments, said needles punching into the backing and creating rows of stitches. In some embodiments, the stitch gauge or distance between the rows of stitches is preset and calibrated prior to tufting. Those individuals skilled in the art are knowledgeable about methods and machines used for the final steps of lubricating, winding, twisting, binding and tufting. This invention comprises all the known methods for the final steps of lubricating, winding, twisting, binding and tufting of artificial turf filaments.

In certain embodiments, prior to said final steps, individual filaments exhibit a helix shape upon exposure to a hot water bath at about 85° C. In other embodiments, filaments exhibit a helix shape after installation of the artificial turf surface upon exposure to ambient heat at about 65.56° C.

Figure 5:
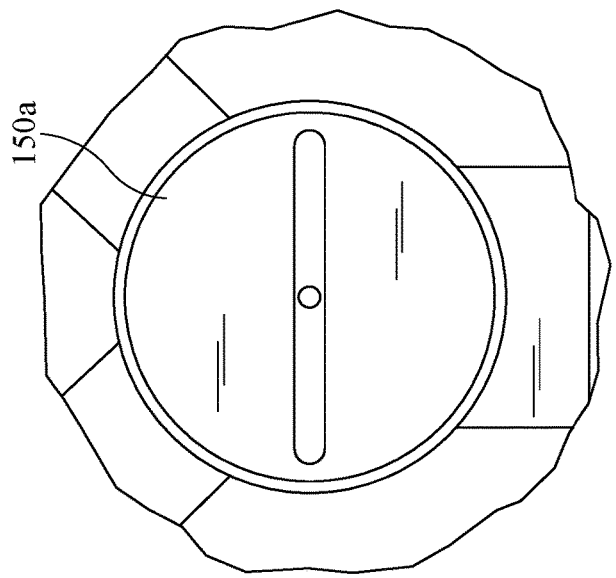
FIG. 5 is a front view of a spinneret hole according to multiple embodiments and alternatives.
Figure 4:
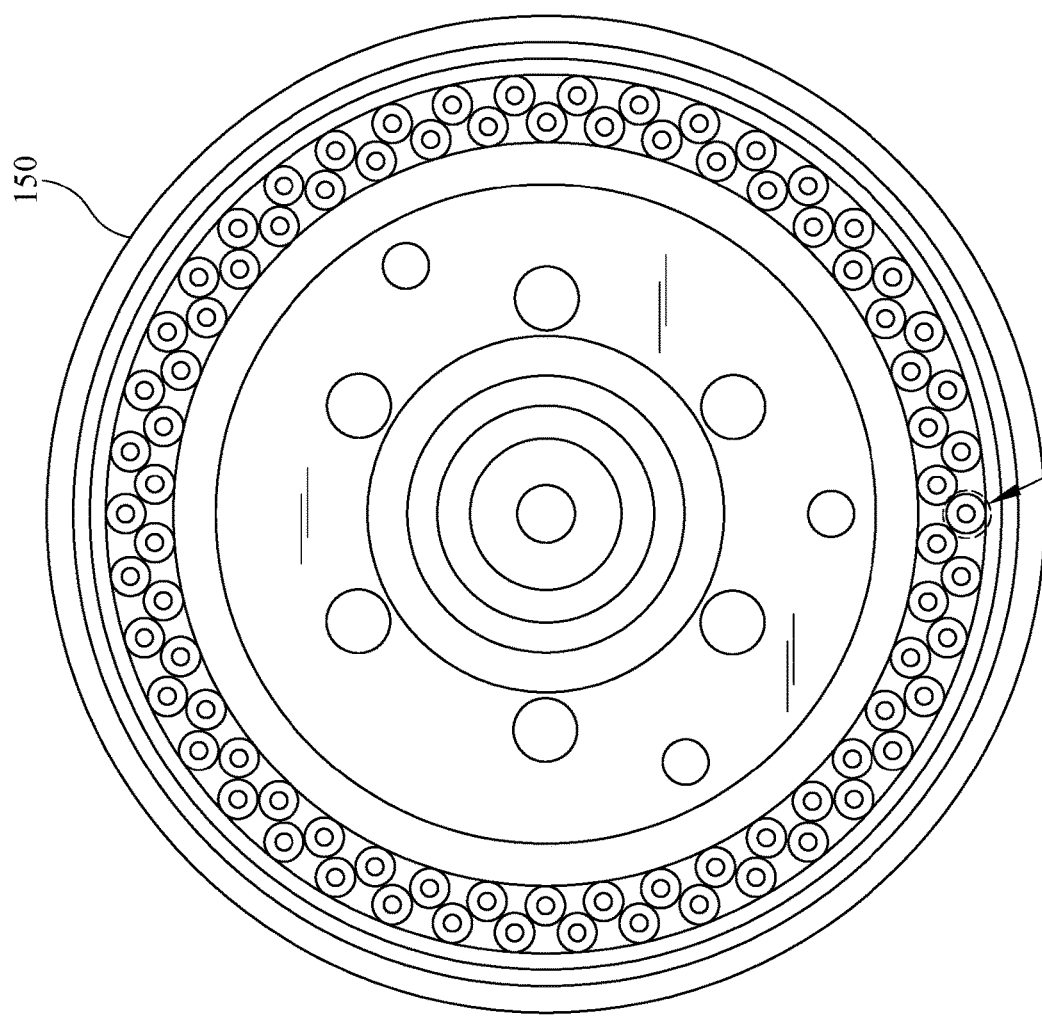
FIG. 4 is a bottom view of a spinneret according to multiple embodiments and alternatives.

Turning to FIGS. 4 and 5, in some embodiments, the system 100 includes spinnerets 150, said spinnerets having one or a plurality of holes 150*a*. In some embodiments, the system 100 utilizes spinnerets 150 to form filaments 110 during melt extrusion wherein each spinneret hole 150*a* has a certain preferred size that corresponds to a certain preferred thickness of the filament to be formed, such thickness being measured in deniers or deniers per filament. Those individuals skilled in the art are familiar with methods and machines for utilizing spinnerets during melt extrusion to form filaments of a variety of deniers. This invention comprises all the known methods for using spinnerets during melt extrusion to form filaments of a variety of deniers.

In other embodiments, however, the system 100 utilizes spinnerets 150 during melt extrusion to create fine surface distortions in the extruded filament, said distortions being visible under a microscope. These distortions, or the so-called "shark skin effect," is desirable for artificial turf surfaces used in sports, particularly football, as it reduces surface glare and improves field visibility for players. In some embodiments, the shark skin effect is imparted onto filaments having a certain preferred denier by reducing the size of the spinneret hole 150*a* typically used to make such filaments not having the shark skin effect. In some embodiments, the size of the spinneret hole 150*a* used to produce such filaments having the shark skin effect is reduced by about 30-35% of the size that is used to make such filaments not having the shark skin effect. For example, in some embodiments, the shark skin effect is imparted onto a filament of about 1450 deniers by using a spinneret hole having a length of about 3.945 mm and a width of about 0.332 mm. By contrast, in those embodiments not imparting the shark skin effect onto filaments, a spinneret hole having a length of about 3.945 mm and a width of about 0.332 mm may be used to form a filament of about 900 deniers.

In another example, the shark skin effect is imparted onto a filament of about 1710 deniers by using a spinneret hole having a length of about 4.706 mm and a width of about 0.347 mm. By contrast, in those embodiments not imparting the shark skin effect onto filaments, a spinneret hole having a length of about 4.706 mm and a width of about 0.347 mm may be used to form a filament of about 1197 deniers.

In some embodiments, the filaments 110 are made from low density polyethylene or polypropylene resin or polyamides. In certain embodiments, the filaments 110 are also made from color dye(s). In certain embodiments, the filaments 110 are also made with additives as process aids.

Figure 2:
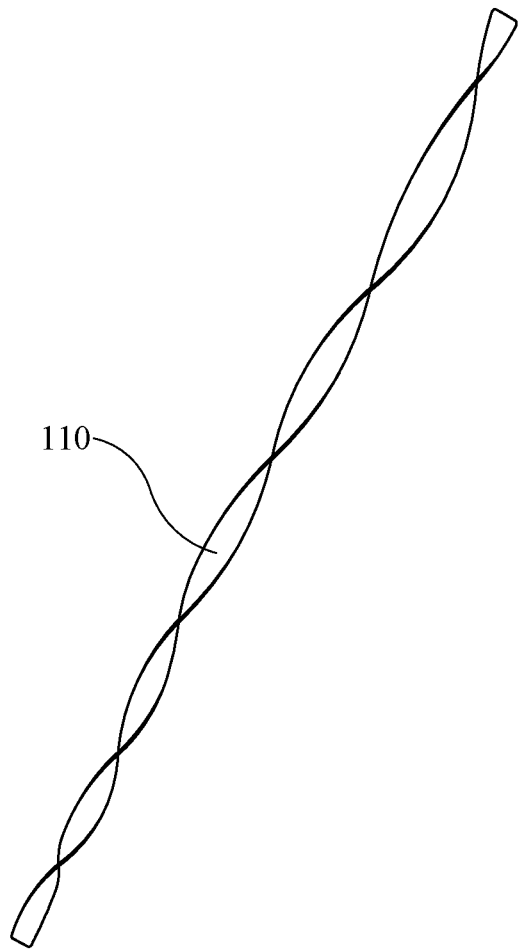
FIG. 2 is a perspective view of an artificial turf filament according to multiple embodiments and alternatives.
Figure 3:
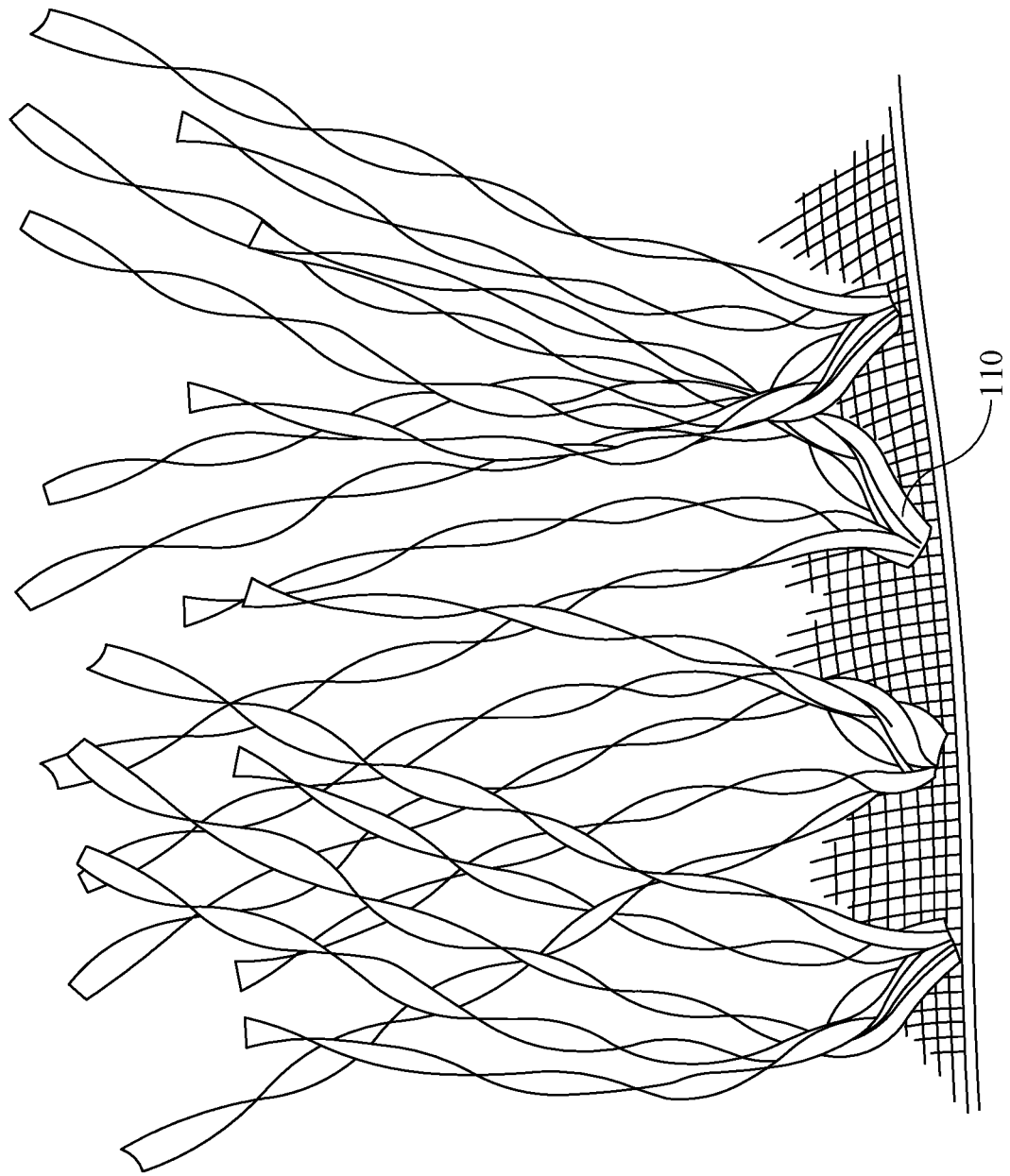
FIG. 3 is a perspective view of artificial turf filaments according to multiple embodiments and alternatives.

Turning to FIG. 2, an example embodiment of the artificial turf filament 110 is illustrated. Example embodiments of the artificial turf filaments 110 are also shown in FIG. 3.

Returning to FIG. 1, in some embodiments, the system 100 produces 100 meters (m) of filaments per minute. In certain embodiments, filament strands are extruded at about 230° C. with the use of spinnerets 150. In certain embodiments, about 184 strands are produced via extrusion through spinnerets 150. In some embodiments, filament strands are then directed through water at about 26° C. for cooling. Filaments also may be directed through a series of dryers 160 that suck and blow water from the filaments at ambient temperatures. In some embodiments, filaments are then drawn onto the first roll stand 130*a* at about 94° C. In certain embodiments, filament strands are drawn onto the first roll stand 130*a* at about 31 m/min.

In some embodiments, filaments are heated in the first air drawn oven 120 at about 105° C. In some embodiments, filaments are drawn onto the second roll stand 130*b* at a rate of about 112 m/min at a ratio of about 3.61 to 1. In some embodiments, filaments are drawn onto the third roll stand 130*c* at about 60 m/min wherein they are wetted or lightly coated with an aqueous solution or water. In some embodiments, filaments are heated in the second air drawn oven 140 at about 136° C. In certain embodiments, filaments are drawn onto the fourth roll stand 130*d* at about 100 m/min to control shrinkage, said fourth roll stand being cooled with water at about 24° C. In some embodiments, filaments are lubricated, wound onto spools, then twisted and tufted onto backings. In certain embodiments, about 8 filament strands are twisted together.

It will be appreciated that the present invention produces helically shaped filaments that provide an aesthetically pleasing appearance, more akin to natural grass than typical straight filaments. Additionally, the helix or corkscrew shape adds bulk to the filaments enabling them to prevent the release of sand, gravel, and other infill materials and therefore decrease the likelihood that players will be hit by infill materials and lessens the displacement of infill materials by players. This improves the durability and longevity of the artificial turf surface.

Further, the present invention provides a latent helical crimp to artificial turf filaments that allows for easier installation of artificial turf surfaces while the filaments are straight. After installation, upon exposure to ambient heat, the filaments form a helix shape providing all of the aesthetic, safety and durability advantages associated therewith.

The foregoing description of several embodiments has been presented for purposes of illustration. It is not intended to be exhaustive or to limit the application to the precise forms disclosed, and obviously many modifications and variations are possible in light of the above teaching. It is understood that the invention may be practiced in ways other than as specifically set forth herein without departing from the scope of the invention.

What is claimed is:

1. A system for manufacturing artificial turf filaments for artificial turf surfaces, the system comprising:
   a spinneret that forms a plurality of artificial turf filaments by melt extrusion;
   a first air drawn oven downstream of the spinneret that heats the plurality of artificial turf filaments to a first temperature;
   a roll stand downstream of the first air drawn oven that applies an aqueous liquid to coat the plurality of artificial turf filaments;
   a second air drawn oven downstream of the roll stand that heats the plurality of filaments to a second temperature, wherein the second temperature is higher than the first temperature.

2. The system of claim 1, wherein each of the plurality of artificial turf filaments exhibits a latent helix shape during manufacturing or when exposed to ambient heat.

3. The system of claim 1, wherein each of the extruded artificial turf filaments has fine surface distortions.

4. The system of claim 2, wherein the latent helix shape is exhibited when the filaments are exposed to manufacturing heat of about 85 degree C.

5. The system of claim 2, wherein the latent helix shape is exhibited when the filaments are exposed to ambient heat of about 65.56 degree C.

* * * * *